US012804073B2

(12) United States Patent
Lee et al.

(10) Patent No.: US 12,804,073 B2
(45) Date of Patent: Nov. 17, 2026

(54) CAPTIONED TELEPHONE SERVICE SYSTEM FOR DETECTING AND ALERTING PEERS RETURN TO CALL

(71) Applicant: Mezmo Corporation, Buena Park, CA (US)

(72) Inventors: Haesung Lee, Irvine, CA (US); Wonjae Cha, Irvine, CA (US); John H Lee, Irvine, CA (US)

(73) Assignee: Mezmo Corporation, Irvine, CA (US)

( * ) Notice: Subject to any disclaimer, the term of this patent is extended or adjusted under 35 U.S.C. 154(b) by 392 days.

(21) Appl. No.: 18/229,939

(22) Filed: Aug. 3, 2023

(65) Prior Publication Data

US 2025/0047783 A1 Feb. 6, 2025

(51) Int. Cl.
*H04M 3/428* (2006.01)
*H04M 3/42* (2006.01)
*H04M 3/493* (2006.01)
*H04M 19/04* (2006.01)

(52) U.S. Cl.
CPC ..... *H04M 3/4286* (2013.01); *H04M 3/42391* (2013.01); *H04M 3/4936* (2013.01); *H04M 19/047* (2013.01); *H04M 19/048* (2013.01); *H04M 2201/40* (2013.01)

(58) Field of Classification Search
CPC ........... H04M 3/4286; H04M 3/42391; H04M 3/4936; H04M 19/047; H04M 19/048; H04M 2201/40
See application file for complete search history.

(56) References Cited

U.S. PATENT DOCUMENTS

| | | | | | |
|---|---|---|---|---|---|
| 3,293,867 | A * | 12/1966 | Dean | E21B 41/0014 | 166/368 |
| 7,974,610 | B2 * | 7/2011 | Nachum | H04Q 3/0079 | 455/423 |
| 8,265,671 | B2 * | 9/2012 | Gould | H04W 4/12 | 704/235 |
| 8,416,925 | B2 * | 4/2013 | Engelke | H04M 1/2473 | 379/52 |
| 8,861,703 | B2 * | 10/2014 | Labrador | H04M 3/56 | 379/202.01 |
| 9,787,831 | B1 * | 10/2017 | Chevrier | H04M 11/10 | |
| 10,264,121 | B2 * | 4/2019 | Reddy | G10L 15/26 | |

(Continued)

*Primary Examiner* — Lisa Hashem

(74) *Attorney, Agent, or Firm* — Heedong Chae; Lucem, PC

(57) ABSTRACT

A captioned telephone service (CTS) system provides a CTS system which includes a CTS server, a user device, and a user application where the CTS system provides a call resumption alert module to the user such that the call resumption alert module sends an alert to the user to assist the user in re-engaging with the phone call when the call has resumed from the peer device after being on hold. The call resumption alert module provides a timer mode, any text mode, and specific text mode, of which the user can select one or more modes. Alternatively, the call resumption alert module may include a call resumption checking module and an alert module. The call resumption checking module checks whether the phone call resumed from the peer device, and the alert module generates an alert upon receiving a call resumption message from the call resumption checking module.

20 Claims, 3 Drawing Sheets

(56) References Cited

U.S. PATENT DOCUMENTS

| | | | | |
|---|---|---|---|---|
| 11,706,332 | B2 * | 7/2023 | Patakokila | H04M 1/82<br>379/393 |
| 12,190,889 | B2 * | 1/2025 | Holm | H04M 1/2475 |
| 12,244,764 | B2 * | 3/2025 | Cha | H04M 3/42391 |
| 2011/0249079 | A1 * | 10/2011 | Santamaria | H04W 4/14<br>348/14.02 |
| 2023/0007121 | A1 * | 1/2023 | Lee | G10L 15/26 |

* cited by examiner

CAPTIONED TELEPHONE SERVICE SYSTEM FOR DETECTING AND ALERTING PEERS RETURN TO CALL

FIELD OF THE INVENTION

The present invention relates to a captioned telephone service ("CTS") system specifically designed for users who are deaf or hard-of-hearing ("DHH"). The CTS system enables the user to disengage from a phone call when it is placed on hold, and then effectively alerts the user to resume the phone call once it has restarted. More particularly, the CTS system provides a call resumption alert module which operates in a timer mode, any text mode, or specific text mode. Upon meeting a certain condition, the call resumption alert module alerts the user to resume the phone call. Furthermore, the call resumption alert module includes a call resumption checking module and an alert module. The former determines whether the phone call from the peer device has resumed, and upon doing so, the alert module generates an alert upon receiving a call resumption message from the call resumption checking module.

BACKGROUND OF THE INVENTION

A captioned telephone service, also known as CTS (herein after referred to as "CTS", "captioned telephone service", or "transcription service"), is used to assist individuals, particularly those who are deaf or hard of hearing ("DHH") but can speak, in making phone calls. A CTS system enables a DHH user (the user) to have a phone call with another person (the peer) who may or may not be DHH by receiving the peer's voice from the peer's device (the "peer device"), transcribing it into caption data, and sending the caption data to the user's device (the "user device") for display as text. This transcription process can be carried out either by a human operator, known as a call agent, or automatic speech recognition (ASR) engine.

The user's device may be the user's own communications device such as a mobile wireless device, mobile phone, smart phone, landline phone, etc., or a terminal provided by a CTS provider. The user can make or receive calls using a user application installed on their device, and receive the transcription services from the CTS server, which is connected to a call agent or ASR engine.

Nevertheless, during telephonic communications, common disruptions such as calls being put on hold, transferred, or experiencing other interruptions pose unique challenges to DHH individuals. Those without hearing impairment can navigate these disruptions relatively easily; they can place the call on speaker mode and continue with their tasks, relying on auditory cues to know when the call resumes. In contrast, DHH users must maintain continuous visual focus on their device's text display screen, waiting for transcriptions to reappear, indicating the call's resumption.

This becomes particularly taxing when interacting with call centers or Integrated Voice Response (IVR) systems, where hold periods can extend for considerable lengths of time. The need for constant screen monitoring during these periods intensifies call fatigue and acts as a significant barrier to efficient phone communication for DHH individuals.

Recognizing these issues, the present invention aims to address them by providing a CTS system that effectively alerts the user when a held phone call resumes. This alert system reduces the need for continuous screen monitoring, alleviating the call fatigue commonly experienced by DHH individuals. It represents a much-needed solution that enhances the call experience for hearing-impaired users, particularly when calls are put on hold. Thus, this invention fulfills a long-standing requirement in this domain, offering a more inclusive and efficient communication environment.

This invention is directed to solve these problems and satisfy the long-felt need.

SUMMARY OF THE INVENTION

The present invention contrives to solve the disadvantages of the prior art. The present invention provides a CTS system for a user who is DHH, where the CTS system enables the user to disengage from a phone call when it is placed on hold, and then effectively alerts the user to resume the phone call once it has restarted.

The object of the present invention is to provide a CTS system which includes a CTS server, a user device, and a user application where the CTS system provides a call resumption alert module to the user such that the call resumption alert module sends an alert to the user to assist the user in re-engaging with the phone call when the call has resumed from the peer device after being on hold from the peer device. The CTS server provides a transcription service to a user during a phone call between the user and a peer. The user device is constructed to be connected to the CTS server for the phone call between the user device and the peer device, and the user application is installed on the user device for the user to use the transcription service. Furthermore, the CTS server is connected to a call agent or automatic speech recognition ("ASR") engine for the phone call to transcribe the voice from the peer device and send the caption data to the user device.

The call resumption alert module may be configured to provide a timer mode, any text mode, and specific text mode, of which the user can select one or more modes. Under the timer mode, the user is allowed to select a specific time period after which the call resumption alert module sends the alert to the user. Under the any text mode, the call resumption alert module sends the alert to the user when the user application receives any text which is transcribed from a voice of the peer device. Under the specific text mode, the call resumption alert module sends the alert to the user when the user application receives a certain text, which is transcribed from the voice of the peer device, where the certain text matches one of expected texts listed in a stored database. Exemplary expected texts include "hello", "thanks you", "thanks for waiting", "thank you for waiting", "speaking", etc., and may be added by the user or the CTS system by analyzing other phone calls.

Another object of the present invention is to provide a CTS system which includes a CTS server, a user device, and a user application, where the CTS system provides a call resumption alert module comprised of a call resumption checking module and an alert module. The call resumption alert module sends an alert to the user to assist the user in re-engaging with the phone call when the call has resumed from the peer device. The call resumption checking module checks whether the phone call resumed from the peer device, and the alert module generates an alert upon receiving a call resumption message from the call resumption checking module. The call resumption message is generated when the call resumption checking module determined that the phone call has resumed from the peer device.

The advantages of the present invention are: (1) the CTS system of the present invention helps users manage their time more effectively during calls, as they can focus on other tasks when the call is on hold and promptly return to the call once it resumes; (2) by providing alerts when the call resumes, the CTS system reduces the need for users to constantly monitor the text display screen, thereby reducing call fatigue; (3) by ensuring that users can return to a call promptly once it has resumed, the CTS system enhances the overall communication experience of users with hearing impairments; (4) the CTS system of the present invention provides several modes for alerts, such as timer mode, any text mode, or specific text mode, offering flexibility to users according to their preferences; (5) the CTS system of the present invention can be easily integrated with various connected devices like smart speakers or smart phones, increasing its usability, such that those connected devices are alerted together with or instead of the user device; (6) Users can select their preferred type of alert (beeping, flashing, vibration, haptic feedback etc.) which best suits their sensory preferences; (7) the present invention provides various ways to determine whether the phone call has resumed from the peer device; and (8) the present invention provides accurate ways to determine whether the phone call has resumed from the peer device, and in case of using analysis of calls, the accuracy improves as the CTS system collects more data.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
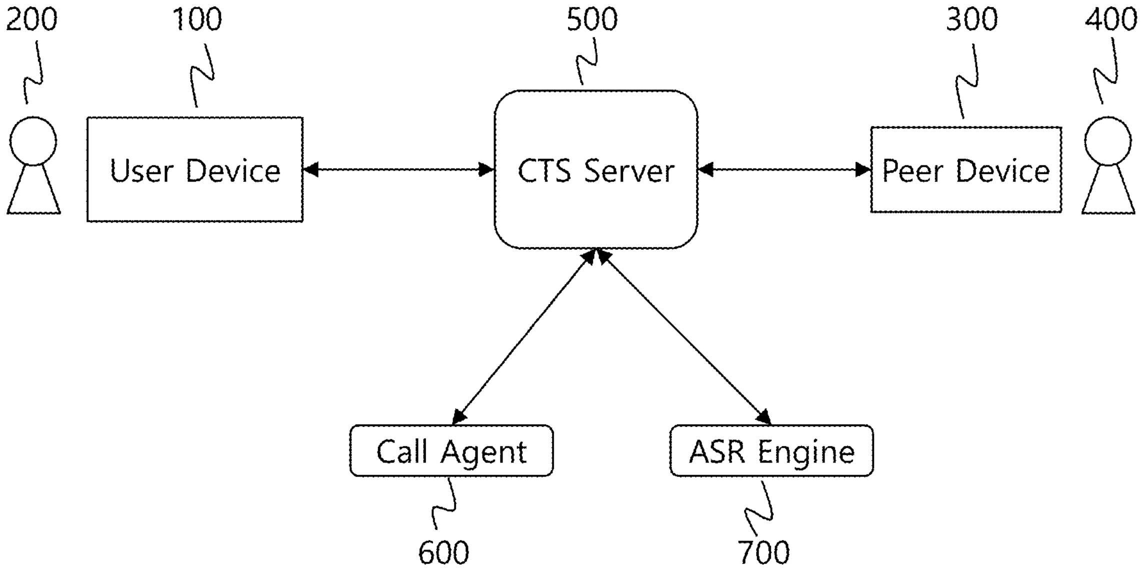
FIG. 1 shows a schematic diagram of the CTS system according to the present invention.
Figure 2:
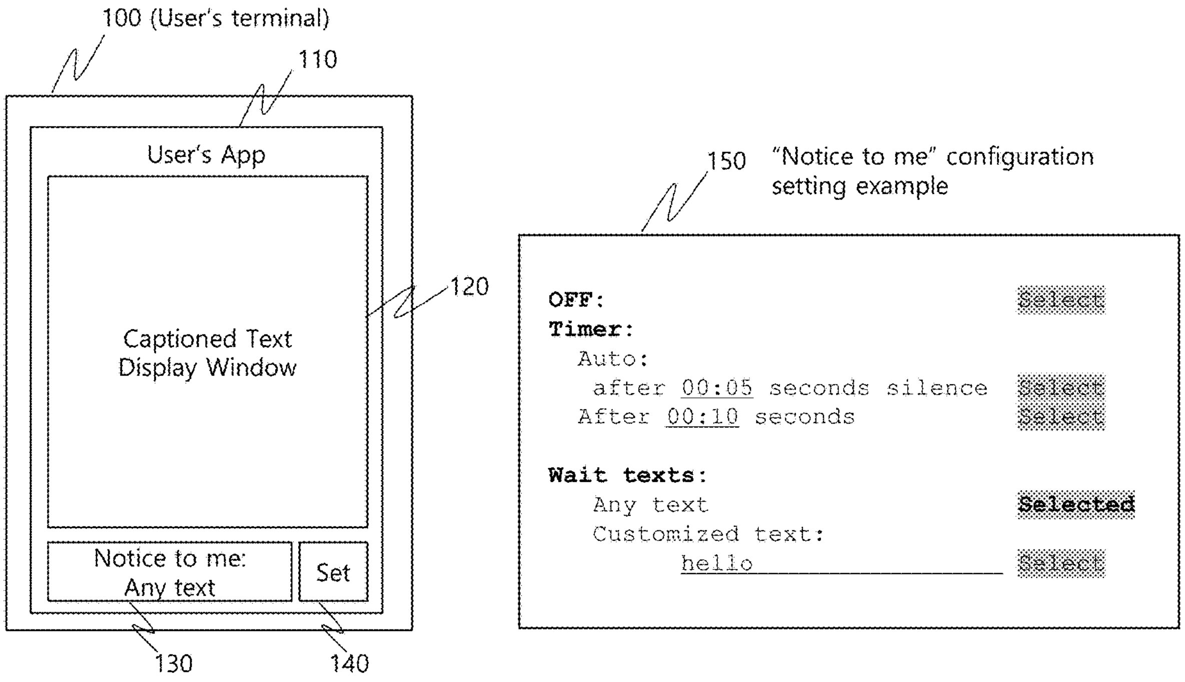
FIG. 2 shows a schematic diagram of the display of the user device according to the present invention.

FIG. 1 shows a schematic diagram of the CTS system according to the present invention, and FIG. 2 shows a schematic diagram of the display of the user device according to the present invention. The captioned telephone service ("CTS") system of the present invention includes a CTS server 500, a user device 100, and a user application 110. The CTS server 500 provides a transcription service to a user 200 during a phone call between the user 200 and a peer 400. The user device 100 is constructed to be connected to the CTS server 500 for the phone call between the user device 100 and a peer device 300 and the user application 110 is installed on the user device for the user 200 to use the transcription service. Furthermore, the CTS server 500 is connected to a call agent 600 or an automatic speech recognition ("ASR") engine 700 for the phone call to provide the transcription service. A call gent 600 is an individual who transcribes the voice from the peer device 300 and sends the caption data to the user device 100 via the CTS server 500. The ASR engine 700 automatically converts the spoken language of the voice from the peer device 300 into written text of the caption data.

The phone call may be placed on hold or being transferred to another person by the peer 400, and the user 200 may have to wait until the phone call resumes. In this case, as explained above, the user 200 with hearing disability may have to wait for an extended period time and continue to watch the screen of the user device, waiting for a caption data. To address this problem, the CTS system 500 is configured to provide a call resumption alert module to the user 200 such that the call resumption alert module sends an alert to the user 200 to assist the user in re-engaging with the phone call. The user application 110 is configured for the user 200 to enable or disable the call resumption alert module. The call resumption alert module may be stored in the user device 100, the CTS server 500, or any other location through which the caption data passes, or even in multiple locations including these.

In one embodiment, the call resumption alert module is configured to provide a timer mode, any text mode, and specific text mode, of which the user 200 can select one or more modes. Under the timer mode, the user 200 is allowed to select a specific time period after which the call resumption alert module sends the alert to the user 200. Under the any text mode, the call resumption alert module sends the alert to the user 200 when the user application 110 receives any text which is transcribed from a voice of the peer device 300 by the call agent 600 or the ASR engine 700. Under the specific text mode, the call resumption alert module sends the alert to the user when the user application 110 receives a certain text, which is transcribed from the voice of the peer device 300 by the call agent 600 or the ASR engine 700, where the certain text matches one of expected texts listed in a stored database. The expected texts may include words, phrases, or sentences, and the database containing these texts may be stored in the user device 100 or the CTS server 500 or both. Exemplary expected texts include "hello", "thanks you", "thanks for waiting", "thank you for waiting", "speaking", etc. Furthermore, the CTS system 500 may be configured to allow the user 200 to add words, phrases, or sentences to the list of expected texts stored in the database.

In addition, the call resumption alert module may be configured to allow the user 200 to select the timer mode together with either the any text mode or the specific text mode in which case the call resumption alert module sends the alert to the user when conditions for both modes are satisfied. For instance, when the user selected the timer mode and any text mode, the call resumption alert module sends the alert to the user if the selected time period has passed and any text is received thereafter. Alternatively, the call resumption alert module may be configured to allow the user 200 to select the timer mode together with either the any text mode or the specific text mode in which case the call resumption alert module sends the alert to the user when a condition for one of the two selected modes is satisfied. For instance, when the user selected the timer mode and any text mode, the call resumption alert module sends the alert to the user when the selected time period has passed and any text is received, whichever happens first.

The alert may be a beeping sound from the user device 200, flashing of the user device's display or light, vibration of the user device 200, haptic feedback from the user device 200, or any other means that effectively stimulates the sensory perception of the user 200. The alert may be just one means or multiple means.

Figure 3:
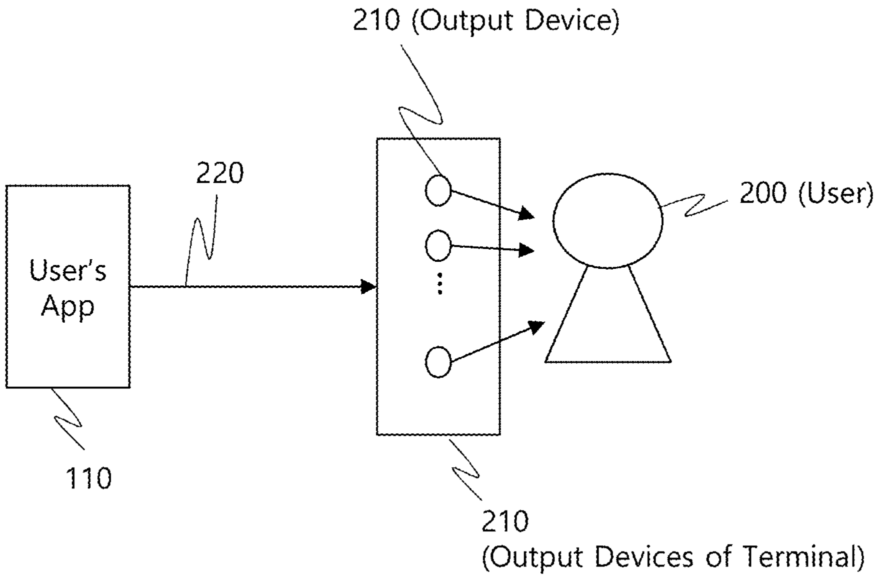
FIG. 3 shows a schematic diagram to send an alert to the user via connected devices according to the present invention.

FIG. 3 shows a schematic diagram to send an alert to the user via connected devices according to the present invention. The call resumption alert module may be configured to send the alert to a connected device 210 which is connected to the user device 200. Such a connected device 210 may be a smart watch, tablet computing device, smart television, virtual assistant (like Alexa (Trademark) or Google Assistance (Trademark)) or the like, which is connected to the user device via Bluetooth, Wi-Fi, near field communication, USB, infrared, etc. The call resumption alert module may be configured to send the alert to the user device 100, the connected device 210, or both.

Another way to initiate sending an alert is by sending a message to the call agent 600 to inquire whether the phone call resumed. Thus, the call resumption alert module may be further configured to send a message to the call agent to inquire whether the peer device has returned to the phone call, and if a reply from the call agent is positive, the call resumption alert module is configured to send the alert to the user 200.

In one embodiment, the call resumption alert module is configured to detect a Dual Tone Multi-Frequency (DTMF) signal originating from the peer device 300. DTMF is a signaling protocol commonly employed in telecommunications, especially in voice telephony systems. Each key press on a touch-tone phone or phone's keypad produces a distinct tone-a DTMF signal-which is a combination of two frequencies (one from a high-frequency group and the other from a low-frequency group). If the peer 400 places the phone call on hold, it is probable that a key such as mute, speaker, or the like has been pressed. Subsequently, when the call is to be resumed, another key is likely to be pressed. Therefore, by detecting a DTMF signal from the peer device 300, the call resumption alert module can determine whether the phone call has been resumed by the peer device 300. If the DTMF signal is detected, the call resumption alert module is configured to send the alert to the user device 200.

If the call resumption alert module detects a DTMF signal originating from the peer device 300 before the user 200 enables the call resumption alert module, and the user 200 enables the call resumption alert module thereafter, then the accuracy in determining a call resumption by the peer device is significantly improved by detecting another DTMF signal originating from the deer device 300 after the user 200 has enabled the call resumption alert module.

In the alternative embodiment, the CTS system includes a CTS server 500, a user device 100, and a user application 110. The CTS server 500 provides a transcription service to a user 200 during a phone call between the user 200 and a peer 400. The user device 100 is constructed to be connected to the CTS server 500 for the phone call between the user device 100 and a peer device 300, and the user application 110 is installed on the user device 100. The CTS server 500 is connected to a call agent 600 or an ASR engine 700 for the phone call to provide the transcription service. The CTS system 500 is configured to provide a call resumption alert module to the user 200 such that the call resumption alert module sends an alert to the user 200 to assist the user 200 in re-engaging with the phone call, and the user application 110 is configured for the user 200 to enable or disable the call resumption alert module.

In addition, the call resumption alert module includes a call resumption checking module and an alert module. The call resumption checking module checks whether the phone call resumed from the peer device, and the alert module generates an alert upon receiving a call resumption message from the call resumption checking module. The call resumption message is generated when the call resumption checking module determined that the phone call has resumed from the peer device.

In one embodiment, the call resumption checking module may be configured to send the call resumption message to the alert module when the user application 110 receives any text which is transcribed from a voice of the peer device 300.

In another embodiment, the call resumption checking module may send the call resumption message to the alert module when the user application 110 receives a certain text, which is transcribed from a voice of the peer device 300, where the certain text matches one of expected texts listed in a stored database. The call resumption checking module may allow the user 200 to add words, phrases, or sentences to the list of expected texts stored in the database. Alternatively, the CTS system itself may add terms, phrases, or sentences to the list of expected texts stored in the database by analyzing other phone calls where the call resumption alert module was employed.

In still another embodiment, the call resumption alert module may be configured to send a message to the call agent 600 to inquire whether the peer device 300 has returned to the phone call, and if a reply from the call agent 600 is positive, the call resumption alert module is configured to send the call resumption message to the alert module. Given that the call agent 600 is a human operator, their responses offer a high level of reliability in determining whether the call has resumed or not.

In still another embodiment, the call resumption checking module may send the call resumption message to the alert module when the call resumption checking module detects a music or background music coming from the peer device 300, the call resumption checking module detects discontinuance of the music or background music from the peer device 300, and the user application receives any text which is transcribed from a voice of the peer device 300. While the transcribed text alone can sometimes be misleading, corroborating it with information about the cessation of background music can significantly enhance the accuracy of the call resumption checking module's decision.

In still another embodiment, the call resumption checking module is configured to retrieve a first voice sample of the peer 400 from the peer device 300 before the user 200 enables the call resumption alert module, and the call resumption checking module is further configured to retrieve a second voice sample coming from the peer device 300 after the user 200 enabled the call resumption alert module. If the first and second voice samples are identified as belonging to the same person, the call resumption checking module would then transmit a call resumption message to the alert module. In other words, the call resumption checking module would send a call resumption message to the alert module if a comparative analysis of the two voice samples suggests that they are both the peer's voice.

In still another embodiment, the call resumption checking module is configured to detect a Dual Tone Multi-Frequency (DTMF) signal originating from the peer device 300. DTMF is a signaling protocol commonly employed in telecommunications, especially in voice telephony systems. Each key press on a touch-tone phone or phone's keypad produces a distinct tone-a DTMF signal-which is a combination of two frequencies (one from a high-frequency group and the other from a low-frequency group). If the peer 400 places the phone call on hold, it is probable that a key such as mute, speaker, or the like has been pressed. Subsequently, when the call is to be resumed, another key is likely to be pressed. Therefore, by detecting a DTMF signal from the peer device 300, the call resumption checking module can determine whether the phone call has been resumed by the peer device 300. If the DTMF signal is detected, the call resumption checking module transmits a call resumption message to the alert module.

The alert may be beeping from the user device, flashing of the user device's display or light, vibration of the user device, haptic feedback from the user device, or any other means that effectively stimulated the sensory perception of the user 200. The alert may be just one means or multiple means.

The call resumption alert module is configured to send the alert to a connected device which is connected to the user device 100, and the connected device may be a smart watch, tablet computing device, smart television, smart assistant, etc., which is connected to the user device via Bluetooth, Wi-Fi, near field communication, USB, infrared, etc The call resumption alert module may be configured to send the alert to the user device 100, the connected device 210, or both.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A captioned telephone service ("CTS") system, comprising:

a CTS server for providing a transcription service to a user during a phone call between the user and a peer;

a user device, which is constructed to be connected to the CTS server for the phone call between the user device and a peer device; and a user application installed on the user device, wherein the CTS server is connected to a call agent or an automatic speech recognition engine for the phone call to provide the transcription service, wherein the CTS system includes a call resumption alert module such that when the phone call is established and becomes active, and the phone call is subsequently placed on hold by the peer such that the peer is diverted from active engagement in the phone call and the user is correspondingly diverted from active engagement in the phone call, the call resumption alert module is configured to send an alert to the user device to assist the user in re-engaging with the phone call, which remains active while on hold, wherein the user application is configured for the user to enable or disable the call resumption alert module.

2. The CTS system of claim 1, wherein the call resumption alert module is configured to provide a timer mode, any text mode, and specific text mode, wherein under the timer mode, the user is allowed to select a time period after which the call resumption alert module sends the alert to the user, wherein under the any text mode, the call resumption alert module sends the alert to the user when the user application receives any text which is transcribed from a voice of the peer device, wherein under the specific text mode, the call resumption alert module sends the alert to the user when the user application receives a certain text, which is transcribed from the voice of the peer device, wherein the certain text matches one of expected texts listed in a stored database.

3. The CTS system of claim 2, wherein the call resumption alert module is configured to allow the user to select the timer mode together with either the any text mode or the specific text mode in which case the call resumption alert module sends the alert to the user when conditions for both modes are satisfied.

4. The CTS system of claim 2, wherein the call resumption alert module is configured to allow the user to select the timer mode together with either the any text mode or the specific text mode in which case the call resumption alert module sends the alert to the user when a condition for one of the two selected modes is satisfied.

5. The CTS system of claim 2, wherein the CTS system allows the user to add words, phrases, or sentences to the list of expected texts stored in the database.

6. The CTS system of claim 1, wherein the alert includes beeping from the user device, flashing of the user device's display or light, vibration of the user device, or haptic feedback from the user device.

7. The CTS system of claim 1, wherein the call resumption alert module is configured to send the alert to a connected device which is connected to the user device, and wherein the call resumption alert module is configured to send the alert to the user device, the connected device, or both.

8. The CTS system of claim 1, wherein the call resumption alert module is configured to detect a Dual Tone Multi-Frequency (DTMF) signal originating from the peer device, and if the DTMF signal is detected, the call resumption alert module is configured to send the alert to the user device.

9. The CTS system of claim 1, wherein the call resumption alert module is configured to send a message to the call agent to inquire whether the peer device has returned to the phone call, and if a reply from the call agent is positive, the call resumption alert module is configured to send the alert to the user.

10. A captioned telephone service ("CTS") system, comprising:

a CTS server for providing a transcription service to a user during a phone call between the user and a peer;

a user device, which is constructed to be connected to the CTS server for the phone call between the user device and a peer device; and a user application installed on the user device, wherein the CTS server is connected to a call agent or an automatic speech recognition engine for the phone call to provide the transcription service, wherein the CTS system includes a call resumption alert module such that when the phone call is established and becomes active, and the phone call is subsequently placed on hold by the peer such that the peer is diverted from active engagement in the phone call and the user is correspondingly diverted from active engagement in the phone call, the call resumption alert module is configured to send an alert to the user device to assist the user in re-engaging with the phone call, which remains active while on hold, wherein the user application is configured for the user to enable or disable the call resumption alert module, wherein the call resumption alert module comprises:

a call resumption checking module for checking whether the phone call resumed from the peer device; and an alert module for generating the alert upon receiving a call resumption message from the call resumption checking module.

11. The CTS system of claim 10, wherein the call resumption checking module sends the call resumption message to the alert module when the user application receives any text which is transcribed from a voice of the peer device.

12. The CTS system of claim 10, wherein the call resumption checking module sends the call resumption message to the alert module when the user application receives a certain text, which is transcribed from a voice of the peer device, wherein the certain text matches one of expected texts listed in a stored database.

13. The CTS system of claim 12, wherein the call resumption checking module allows the user to add words, phrases, or sentences to the list of expected texts stored in the database.

14. The CTS system of claim 12, wherein the CTS system is configured to add words, phrases, or sentences to the list of expected texts stored in the database by analyzing phone calls.

15. The CTS system of claim 10, wherein the call resumption alert module is configured to send a message to the call agent to inquire whether the peer device has returned to the phone call, and if a reply from the call agent is positive, the call resumption alert module is configured to send the call resumption message to the alert module.

16. The CTS system of claim 10, wherein the call resumption checking module sends the call resumption message to the alert module when the call resumption checking module detects a music or background music coming from the peer device, the call resumption checking module detects discontinuance of the music or background music from the peer device, and the user application receives any text which is transcribed from a voice of the peer device.

17. The CTS system of claim 10, wherein the call resumption checking module retrieves a first voice sample from the peer device before the user enables the call resumption alert module, wherein the call resumption checking module retrieves a second voice sample from the peer device after the user enables the call resumption alert module, wherein the call resumption checking module sends the call resumption message to the alert module if an analysis of the first voice sample and the second voice sample indicates that both of the two voice samples are made by the peer.

18. The CTS system of claim 10, wherein the alert includes beeping from the user device, flashing of the user device's display or light, vibration of the user device, or haptic feedback from the user device.

19. The CTS system of claim 10, wherein the call resumption alert module is configured to send the alert to a connected device which is connected to the user device, and wherein the call resumption alert module is configured to send the alert to the user device, the connected device, or both.

20. The CTS system of claim 10, wherein the call resumption checking module is configured to detect a Dual Tone Multi-Frequency (DTMF) signal originating from the peer device, and if the DTMF signal is detected, the call resumption checking module is configured to send the call resumption message to the alert module.

* * * * *